May 24, 1927. 1,629,831
H. B. MAGLATHLIN
CRANBERRY HARVESTING APPARATUS
Filed Nov. 8, 1923
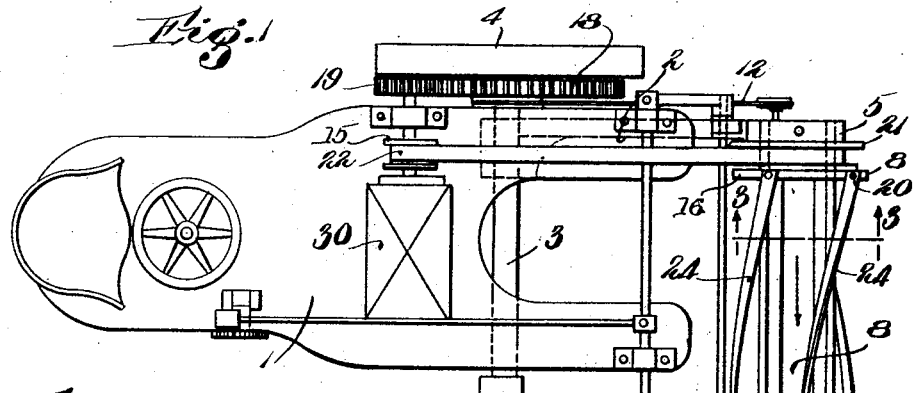
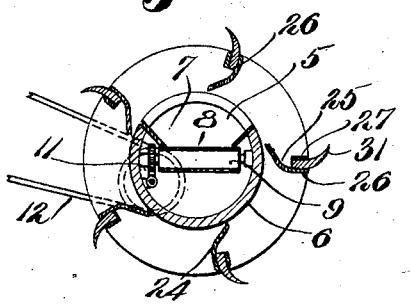
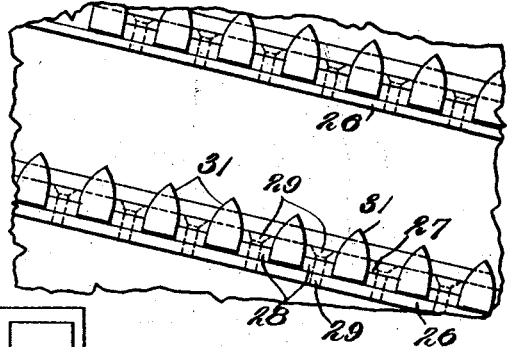
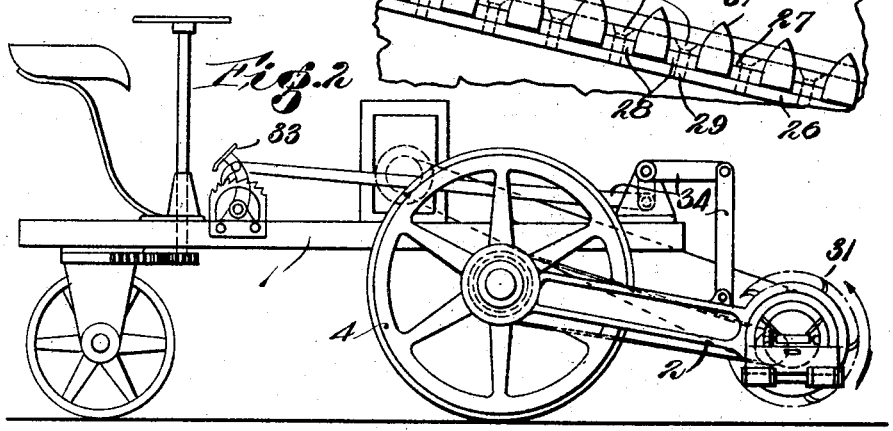
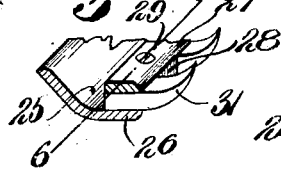
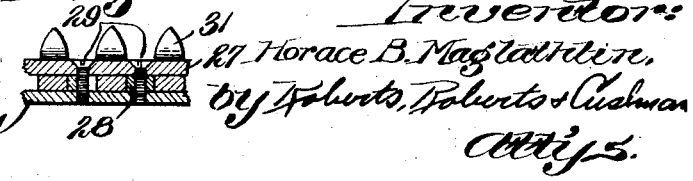
Inventor: Horace B. Maglathlin Patented May 24, 1927.

1,629,831

UNITED STATES PATENT OFFICE.

HORACE B. MAGLATHLIN, OF KINGSTON, MASSACHUSETTS.

CRANBERRY-HARVESTING APPARATUS.

Application filed November 8, 1923. Serial No. 673,511.

This invention relates to berry-harvesting machines and the like, and is especially directed to the picking element of such machines which removes the berries from the vines and conveys them to a receiver.

A principal object of the invention is to improve and facilitate the assembling and subsequent replacement or repair of the picking element on such machines and at the same time provide a construction which is adaptable to and will resist the conditions to which it is ordinarily subjected while in use. It is also an object of this invention to provide a device which will remove all or a large part of the berries but at the same time avoid injury to the vines from which they are being harvested.

One embodiment of the invention which is typical of its adaptation in practice, will be described in connection with a cranberry harvester, as shown in the accompanying drawings, in which:—

Fig. 1 is a plan view of a complete cranberry harvesting machine (the picking teeth being removed);

Fig. 2 is a side elevation thereof showing the teeth in position;

Fig. 3 is a detailed section of the assembled picking element;
Fig. 4 is a longitudinal developed view of the same;

Fig. 5 is a detailed perspective of the picker teeth and mountings therefor; and Fig. 6 is a sectional view on line 6—6 of Fig. 5.

Referring to the drawings, 1 represents generally a cranberry harvesting machine of well known type and construction, which may be horse drawn, or motor driven as shown. From the axle 3 upon which the supporting wheels 4 are fixed in usual manner, are pivotally mounted supporting frames 2 which have annular bearings 5 at their forward extremities. Within said bearings and fixedly mounted between said frames is a cylindrical receptacle 6, having a longitudinal opening 7 in the top and an outlet 10 extending through one of said frames 2. Within the receptacle 6 and parallel to opening 7 there is provided a horizontal conveyor belt 8 mounted upon rollers 9 and extending through outlet 10. This belt is operated by gears 11 and a belt 12 which passes over a pulley on the axle 3. A box 14 is held upon a bracket fastened to the frame 2 under the discharge end of said conveyor belt 8.

Mounted upon said annular bearings 5, and surrounding receptacle 6, are provided headers 16 and 17. Between the outer peripheries of the headers 16 and 17 are fastened, as by bolts 20, elongated blades or channel members 24, the outer edge 26 of each being upturned and the inner edge adapted to just clear the cylindrical receptacle 6 as shown in Fig. 3. The longitudinal contour of these blades or channel members is preferably helical and each is provided adjacent its outer edge, with a clamping bar or rod 27 which is parallel thereto but is spaced therefrom by a plurality of blocks 28. Passing through each block 28 and adapted to be tightened and to fasten said bar 27 to the edge of its corresponding channel member 24 is a machine screw or bolt 29. Between said bar and channel member and alternating with the spacing blocks are inserted upwardly disposed teeth 31 which are slightly thicker than said blocks and accordingly receive the pressure between the bar and blade and are gripped thereby.

Fixedly mounted upon one end of the axle 3 is a large gear 18 meshing with gear 19, which is mounted on the machine 1, and connected with motor 30, and has at the opposite end of its shaft a pulley 15. Passing over pulley 15 and a similar pulley 21 which is fastened upon the head 16, is the belt 22. The harvester may be driven by a motor 30, directly connected to gear 19 as shown in Figure 1, or it may be horse drawn, in which case gear 18 on the wheel will drive gear 19, with the same result.

A pedal 33 and levers 34 are also provided upon the machine 1 by which the frames 2 may be raised or lowered, thus lifting the picking device from the ground, or dropping it into operative position as desired. As the machine 1 is driven over the ground, by horse or by motor, the rotation of its axle 3 and gear 18 thereon or the motor 30, will drive in turn gear 19, pulley 15, belt 22, and pulley 21 and thereby rotate the head 16. The rotation of head 16 will cause the opposite head 17 and channel members 24 therebetween to rotate therewith as a unit, preferably in the same direction as the advance of the machine on the under side or counterclockwise as shown by the arrow in Fig. 2. With the picking element in lowered position, the edges 26 of channel members 24 will be rotated upwardly against the bushes or vines in front of them. The projecting teeth 31, due to the angular disposition of channel members 24, will successively pass upward through the vines, and strip the berries therefrom. As the channel member rises higher the berries will fall inward upon its lower or channel portion 25 and then fall through the opening 7 of the receptacle 6, where they will be received by the conveyor belt 8 and carried through outlet 10 to the box 14. In such service, it will be apparent that the picker teeth 31 are subjected to severe strains, and as a result frequent breakage is liable to occur. Consequently it often becomes necessary to repair or renew them, and it is exceedingly desirable that this may be accomplished simply and quickly. In order to do this in the present device, it is only necessary to loosen the screws 29 on either side of the defective tooth (thus relieving the gripping action thereon between channel member 24 and the clamping bar 27), to withdraw the broken tooth, insert a new tooth and to retighten screws 29 thus drawing bar 27 and channel member 24 together and re-gripping the new tooth. The machine is then ready for service again, with a minimum of delay or labor on the part of the operator, and the use of only a screw driver is necessary. Such breakage is confined to the individual tooth, in the first instance, and only the defective part is involved in the repairing operation. The adjustment of other parts is entirely unaffected.

Moreover, it is to be observed that by this invention, the projecting portion of the tooth may be adjusted to that length which is most effective for the purpose. Different sizes and shapes of teeth may also be employed and the distance at which they are spaced apart will be regulated by the spacing blocks accordingly.

I claim:

1. In a berry picking machine or the like, a pair of spaced rotatable heads, means for rotating the same, a picking element mounted thereon, comprising a channel member so disposed as to constitute a support for picked berries when the element is in picking position and having a radial flange, and picker teeth adjustably mounted upon the radial flange of the channel member.

2. In a berry picking machine or the like, a pair of spaced rotatable heads, means for rotating the same, a picking element mounted thereon, comprising a channel member so disposed as to constitute a support for picked berriers when the element is in picking position and having a radial flange, picker teeth mounted upon said radial flange, and means for adjustably tightening said teeth upon said radial flange.

3. In a berry picking machine or the like, a pair of spaced rotatable heads, means for rotating the same, a picking element mounted thereon, comprising a channel member so disposed as to constitute a support for picked berries when the element is in picking position and having a radial flange, a clamping bar parallel to the radial flange, picker teeth between said bar and flange, and clamping means for drawing said bar and flange together.

4. In a berry picking machine or the like, a pair of spaced rotatable heads, means for rotating the same, a picking element mounted thereon, comprising a channel member so disposed as to constitute a support for picked berries when the element is in picking position and having a radial flange, a clamping bar parallel to the radial flange, picker teeth between said bar and flange, spacing blocks between the picker teeth and clamping means for drawing said bar and flange together.

5. In a berry picking machine or the like, a pair of spaced rotatable heads, means for rotating the same, a picking element mounted thereon, comprising a channel member so disposed as to constitute a support for picked berries when the element is in picking position and having a radial flange, a clamping bar parallel to the radial flange, picker teeth between said bar and flange, spacing blocks between the picker teeth, the spacing blocks being of lesser thickness than the picker teeth, and clamping means for drawing said bar and flange together.

6. In a berry picking machine or the like, a pair of spaced rotatable heads, means for rotating the same, a picking element mounted thereon, comprising a channel member so disposed as to constitute a support for the picked berries when the element is in picking position and having a radial flange, a clamping bar parallel to the radial flange, alternate picker teeth and spacing blocks between said bar and flange, and a clamping screw passing through each of the spacing blocks and engaging adjacent portion of the bar and flange.

7. In a berry picking machine or the like, a pair of spaced rotatable heads, means for rotating the same, a picking element mounted thereon, comprising a helical channel member so disposed as to constitute a support for the picked berries when the element is in picking position and having a radial flange, a helical clamping bar parallel to the radial flange, alternate picker teeth and spacing blocks between said bar and flange, and a clamping screw passing through each of the spacing blocks and engaging adjacent portions of the bar and flange.

8. In a berry picking machine or the like, a pair of spaced rotatable heads, means for rotating the same, a picking element mounted thereon, comprising a helical channel member, so disposed as to constitute a support for the picked berries when the element is in picking position and having a radial flange, a helical clamping bar parallel to the radial flange, picker teeth mounted upon said radial flange, and means for adjustably tightening said teeth upon said radial flange.

Signed by me at Boston Massachusetts this 15th day of October, 1923.

HORACE B. MAGLATHLIN.